(12) United States Patent
Niewöhner

(10) Patent No.: US 10,481,481 B2
(45) Date of Patent: Nov. 19, 2019

(54) CAMERA MOUNTING FOR STEREOSCOPIC PANORAMIC RECORDINGS

(71) Applicant: BERLINER KTA SHAREHOLDER GMBH, Berlin (DE)

(72) Inventor: Dennis Alexander Niewöhner, Gütersloh (DE)

(73) Assignee: BERLINER KTA SHAREHOLDER GMBH, Berlin (DE)

(*) Notice: Subject to any disclaimer, the term of this patent is extended or adjusted under 35 U.S.C. 154(b) by 0 days.

(21) Appl. No.: 15/772,360

(22) PCT Filed: Nov. 7, 2016

(86) PCT No.: PCT/DE2016/000387
§ 371 (c)(1),
(2) Date: Apr. 30, 2018

(87) PCT Pub. No.: WO2017/076383
PCT Pub. Date: May 11, 2017

(65) Prior Publication Data
US 2018/0321580 A1  Nov. 8, 2018

(30) Foreign Application Priority Data
Nov. 5, 2015 (DE) .......................... 10 2015 118 997

(51) Int. Cl.
*G03B 37/04* (2006.01)
*G03B 17/56* (2006.01)
(Continued)

(52) U.S. Cl.
CPC ............ *G03B 37/04* (2013.01); *F16M 13/02* (2013.01); *F16M 13/04* (2013.01);
(Continued)

(58) Field of Classification Search
USPC ........................................................ 396/419
See application file for complete search history.

(56) References Cited

U.S. PATENT DOCUMENTS 2,893,303 A * 7/1959 Anthony ................ F16M 11/18
                                                              396/329
5,752,113 A * 5/1998 Borden ................ F16M 11/105
                                                              396/428
(Continued)

FOREIGN PATENT DOCUMENTS

DE   102012012817 A1   1/2014
EP       2679878 A2    1/2014
(Continued)

OTHER PUBLICATIONS

International Search Report and Written Opinion from PCT/DE2016/000387, filed Nov. 7, 2016.

*Primary Examiner* — Clayton E. LaBalle
*Assistant Examiner* — Warren K Fenwick
(74) *Attorney, Agent, or Firm* — Westman, Champlin & Koehler, P.A.

(57) ABSTRACT

A camera-mounting apparatus includes a mechanically stabilizing frame, a plurality of camera fastenings, each being suitable for receiving and fixing at least one camera. The camera fastenings are attached in a distributed manner around the frame and are oriented such that a total field of view of all the cameras is larger than a field of view of an individual camera. Each point of the total field of view lies in the field of view of at least two of the cameras. An interior of the frame includes a cavity for receiving a support, in particular the head of a person wearing the device or a small (approximately head-sized) vehicle or aircraft.

21 Claims, 5 Drawing Sheets

(51) Int. Cl.
*G03B 35/10* (2006.01)
*F16M 13/02* (2006.01)
*F16M 13/04* (2006.01)
*G03B 35/08* (2006.01)
*H04N 13/204* (2018.01)
*H04N 13/282* (2018.01)

(52) U.S. Cl.
CPC ........... *G03B 17/561* (2013.01); *G03B 35/08* (2013.01); *G03B 35/10* (2013.01); *H04N 13/204* (2018.05); *H04N 13/282* (2018.05)

(56) References Cited

U.S. PATENT DOCUMENTS

| | | | | |
|---|---|---|---|---|
| 7,463,280 | B2* | 12/2008 | Steuart, III | G03B 35/08 |
| | | | | 348/36 |
| 9,152,019 | B2* | 10/2015 | Kintner | G03B 17/561 |
| 9,413,930 | B2* | 8/2016 | Geerds | H04N 5/2252 |
| 9,575,394 | B1* | 2/2017 | Wallace | H04N 5/2252 |
| 9,911,454 | B2* | 3/2018 | van Hoff | G11B 19/20 |
| 10,027,948 | B2* | 7/2018 | Cole | G03B 17/561 |
| 2005/0207487 | A1* | 9/2005 | Monroe | G08B 13/19628 |
| | | | | 375/240.01 |
| 2006/0239678 | A1* | 10/2006 | Itzkowitz | F16M 11/041 |
| | | | | 396/419 |
| 2007/0097206 | A1* | 5/2007 | Houvener | G03B 35/08 |
| | | | | 348/26 |
| 2007/0126863 | A1* | 6/2007 | Prechtl | H04N 5/232 |
| | | | | 348/43 |
| 2014/0104378 | A1* | 4/2014 | Kauff | H04N 5/247 |
| | | | | 348/38 |
| 2014/0153916 | A1 | 6/2014 | Kintner | |
| 2015/0220085 | A1* | 8/2015 | Ohtomo | G08G 5/0069 |
| | | | | 701/2 |

FOREIGN PATENT DOCUMENTS

| | | |
|---|---|---|
| WO | 2014071400 A1 | 5/2014 |
| WO | 2015085406 A1 | 6/2015 |
| WO | 2017076383 A1 | 5/2017 |

* cited by examiner

CAMERA MOUNTING FOR STEREOSCOPIC PANORAMIC RECORDINGS

CROSS-REFERENCE TO RELATED APPLICATIONS

This Application is a Section 371 National Stage Application of International Application No. PCT/DE2016/000387 filed Nov. 7, 2016, which is incorporated by reference in its entirety and published as WO/2017/076383 A1 on May 11, 2017, not in English.

FIELD

The present invention describes a camera-mounting apparatus comprising a mechanically stabilizing frame and a plurality of camera fastenings, each adapted to receive at least one camera, wherein the camera fastenings are distributed around the frame and oriented such that the overall field of view of all cameras comprises a full circle or the entire sphere.

BACKGROUND

Since its technical invention at the beginning of the 19th century, photography has made great strides until the present day. Ever more sensitive photochemical processes that initially only permitted black-and-white and later colour photographs, have now been largely replaced by digital photography, in which the image information is generally recorded by light-sensitive electronic sensors, so-called CCD sensors. The sampling rates of the CCD sensors used today in digital cameras is high enough to also record moving pictures, that is to say videos, with any suitably programmed digital camera.

SUMMARY

A preferred type of photos is wide-angle or panorama pictures. The goal here is often to cover the widest possible angular range, that is to say a full circle, generally a horizontal, or even a half or full, sphere around the location of an observer. This goal can be achieved in principle in three ways.

On the one hand, through the use of wide-angle or fish-eye lenses. With the latter sight-cone aperture angles up to 240 degrees are very feasible. However, they have the disadvantage that image distortions occur—all the more so, the farther the pixel is away from the optical axis. In a digitally captured image, such distortions, in principle, can be corrected by calculation, but this involves computing effort, on one hand and, on the other hand, the problem remains that the pixel density, and thus the sharpness of the corrected image, is lower for large angles with respect to the optical axis than for small angles, that is to say different areas of the corrected image are displayed with different sharpness.

The other two options can be combined under one principle, namely that the entire field to be imaged is covered with a plurality of overlapping partial images, and then, in the case of digital pictures, the frames are suitably stitched together by means of software. This principle can be implemented in two ways: the recordings can created serially, usually by means of a single camera, or in parallel.

The serial version has the obvious advantage that only a single camera, and no special camera mounting, is required, which saves costs and keeps the (physical) effort low. For example, most modern camera phones have software that permits panoramic images to be almost created in real time, in that the user allows the field of view of the camera built into the phone to pass through the region to be photographed. However, usually only a linear scanning is provided, which is why a horizontal 360-degrees (cylindrical) panoramic, though not a (hemi) spherical panorama can be photographed. For landscapes, in which the objects to be imaged are very far away, compared to the focal length of the lens, it is perfectly adequate to photograph a horizontal panorama, if the photographer together with the camera rotates around the vertical axis, the camera panning about a (partial) circle. However, if a panorama of closer objects is to be shot, so it is appropriate for a distortion-free photograph, to use a camera suspension that allows parallax-free panning of the camera. Such a suspension is described for example in the published patent application DE 10 2012 012 817.

For photographing a panorama in parallel, multiple cameras looking in different directions are used. If the total field of view of the cameras includes the image area to be photographed, a single photographing operation is sufficient; otherwise the parallel method must be combined with the above-described serial method. The latter can be avoided, by using enough cameras to cover the entire spherical spatial angle. However, in practice one is often mainly interested in imaging a full circle around the viewer/photographer.

To correctly assemble the shots from individual cameras into an individual image, the relative position of the cameras at the time of photographing must be known as precisely as possible. Therefore, and in order to use the same calculation method from shot to shot, it is useful to fix all the cameras together in a corresponding fixture, the dimensions of which are precisely known and which are programmed into the software used to assemble the entire image. Several embodiments of camera mounts required for this method are disclosed for example in the patent WO 2014/071400. A mounting device is of course also usually indispensable for other practical reasons, for example to allow convenient transportation in a ready-to-use condition, perhaps even without the use of hands by means of a head-mounted carrying device or the like.

The parallel method for taking panoramic images has the disadvantage of being relatively expensive, since, for practical advantages, a plurality of cameras, which for practical reasons are all the same, and a suitable mounting device are required. However, it has the distinct advantage that the photographs are taken faster. The serial photographing of a 360° panorama using a single camera, with the slow, even panning that is usually required, takes at least about one second, and often several seconds. If a sufficient number of cameras fixed in a corresponding device cameras exist, the same process, in the parallel method, takes only as long as the time required for photographing a single image, which results from the sum of the exposure time and readout time, as well as dead time of the image sensor. Since the latter are in the millisecond range, it is thus possible under appropriate lighting conditions, to create video recordings of 360-degree panoramas or even the full spherical spatial angle.

A further increase towards a more lifelike viewing can be achieved with stereoscopic images, known as 3D images. In these the same scene is imaged from at least two different angles, so that, during viewing, a corresponding image can be presented to each eye. The simplest implementation is by means of two horizontally spaced cameras looking in the same direction, the imaging of the left camera being shown to the left eye, and, correspondingly, the right hand image being shown to the right eye. Depending on the distance between the two cameras, also called stereo base, a normal stereoscopic visual impression is produced in a different distance range. If the distance between the cameras corresponds, for example, to the normal eye spacing, i.e. a few centimetres, there is also a 3D impression corresponding to the usual visual impression, in which objects up to 10 m distant from the viewer still have a noticeable parallax, so that the brain is able to obtain depth and distance information. If, however, a larger stereo base of some 10 cm, 1 m or more is used, this limit increased from 10 m to 50 m, 100 m or more. Conversely, with a large stereo base, it is difficult to look at very close objects, because a parallax that is unusually large for humans occurs so that the brain can no longer combine the two partial images into a single stereoscopic image, manifested as double vision or a distorted visual impression, and with continued observation, especially with moving images, can lead to dizziness or nausea.

Creating stereoscopic 360-degree panoramic images is a challenge that it has only been possible to address recently. In particular, the company Google offers the Jump Assembler image editing software in conjunction with a circular camera holder with 16 cameras, by means of which this goal can be realised. However, since the cameras are arranged at the corners of a regular hexadecagon, and also look in the corresponding radial direction, that is to say all form an angle of (integral multiples of) 22.5 degrees to each other, there is a fairly uniform coverage, however the joining of the overall picture is extremely computationally intensive, especially with the resolutions used.

Furthermore, at Samsung, a stereoscopic 360-degree photography system is under development under the project names "Beyond," which will be characterised particularly by its small and compact design. In this case, 16 cameras are also used, but in the form of 8 paired cameras with overlapping fields of view. The arrangement and alignment considerably reduces the computational effort necessary for joining, however results in the disadvantages of a less uniform coverage of the spatial angle range to be imaged, and related thereto, to a more viewing-direction-dependent stereo impression.

The systems described above have in common that, by virtue of their design, they cannot be combined with a head-mounted carrying device or a device for fastening such that the carrier, whether human or for example, a model helicopter or the like, is not included in the overall field of view.

Against this background, therefore, it is the object of the present invention to discover a device that permits stereoscopic panoramic images, in particular 360-degree panoramas, to be produced, and thereby can be combined with a head-mounted carrying device or a device for fastening to a small, unmanned carrier vehicle or aircraft.

This object is achieved according to the invention by means of a camera mounting device with the features specified in claim 1.

A mechanically stable structure supports a plurality of camera fastening, which are arranged and directed such that the entire field of view of all cameras covers a desired spatial angle, in particular a full circle, and every direction lies within the visual field of at least two cameras and the frame is hollow in the interior and provides space for receiving a carrier, in particular a human head or a vehicle or aircraft of approximately the size of a head. The frame is approximately ring-shaped, toroidal, polygon-ring-shaped, bowl-shaped or polyhedral-bowl-shaped in design.

The device according to the invention allows stereoscopic photos to be taken in a 360-degree full circle in which all individual images are shot simultaneously, thereby allowing, besides still images, also video recordings. By the fact that the frame is designed to be internally hollow as a circular or polygonal ring or torus, or else as a shell or polyhedral shell, the camera-mounting apparatus described herein can be easily combined with a head-mounted carrying device or fastened to a small vehicle or aircraft such that the carrier lies outside of the overall field of view, irrespective of how big the field of view is, that is to say of what spatial angle it comprises.

If a head-mounted carrying device is used, the hands can thereby remain free. This opens up new opportunities for immersion of the viewer in the action, whether at social events such as parties or celebrations, at sporting events or action shots such as bungee jumping, mountain bike descents, paragliding flights, and the like, or else for nature shots of coral reefs, flocks of birds and the like.

There is also the possibility that any viewer can become his own cameraman, so to speak, in that he can select the viewing direction and zoom level himself. The position of the camera is herein the only thing that is fixed.

By means of the device according to the invention, it is further possible to see experienced events and incidents from a completely new perspective and, for example, to find out what took place behind one's own back at the same time. Such panoramic videos thus go beyond the purpose of purely refreshing one's memory and permit a new viewing experience.

Since each direction of the total field of view is covered at least twice, that is to say by two different cameras, all images can be viewed in more lifelike, stereoscopic form, which further reinforces the realism and immersion that is achieved.

However, the essential advantage of the camera-mounting apparatus according to the invention is that the particular construction as a hollow ring or bowl-shaped frame enables wearing on the head or, by means of small autonomous or remotely controlled vehicles or, in particular, aircraft, without the carrier itself appearing in the visual field of the cameras and thus in the picture area. Thus, as with other panorama camera-mounting apparatus, not only can a full circle or full sphere, minus a section showing the carrier or the carrier system, which commonly perceived as disturbing, be covered, but this is actually possible completely undisturbed.

If the video information is linked to local information obtained by an additional sensor, such as a GPS receiver, the virtual exploration of a neighbourhood (à la Google Street View) can also be made possible with unprecedented accuracy of detail and to an unrivalled extent by means of the camera-mounting apparatus according to the invention.

The monitoring of an environment without any blind spots in real time is also interesting for civilian and military security applications, for example, for security guards or scouts on reconnaissance missions.

Even in cases where the camera mounting device according to the invention is not the essential or main payload of a support system, it can still be usefully employed. As safety equipment for unmanned aerial vehicles, it can be usefully employed for example for collision avoidance in conjunction with a real-time image evaluation. Due to the ensured all-round visibility, a flying object approaching from any direction can be detected, the distance determined by means of the parallax and, evasive action be initiated as appropriate.

In the following, advantageous further embodiments, which can be implemented individually or in combination, are presented.

The work required for partial images is reduced significantly if the cameras and the camera fastenings are arranged in pairs, that is to say, two cameras always look in the same direction at a certain fixed distance from each other. This can be advantageously realized most straightforwardly if the camera fastenings are provided at the corners of an equilateral polygon or polyhedron. Through this regular, paired arrangement, the image adjustment to be performed is equal for all adjacent sides.

In the interior of the camera mounting device according to the invention, damping elements are advantageously present, which stabilize the device and, thereby, the cameras that it carries against vibrations of the support, thus enabling a better image quality. This damping may be in the form of pads, e.g. of foam or mechanical or hydraulic shock absorbers. Especially when, by means of the device according to the invention, it is intended to record videos from movement, such as running, or from flight, sufficient image stabilization is essential for a pleasant viewing experience, particularly where high frequencies are to be suppressed.

Further devices for attachment to a carrier system, which are connected to the frame via the damping elements, are located in the interior of the camera-mounting apparatus according to the invention. This may be a head-mounted carrying device comprising a head-chin strap system similar to a cycle helmet, or cords, clamps, screw clamps or clamping rings for attaching the camera mounting device to a small unmanned aerial vehicle or aircraft. The latter are prepared accordingly, such that the damping elements or other connectors can be attached directly to them, for example screwed. In any case, the carrier would be positioned approximately in the centre of the annular or bowl-shaped frame and detachably attached to the camera-mounting apparatus.

The frame is expediently constructed and optimized, for example by the fact that reinforcing ribs are attached or incorporated so that for a given minimum weight, high stiffness against torsion and twisting is achieved. These deformations specifically move the camera positions with respect to each other and are thus detrimental to a good image quality.

It is expedient to construct the apparatus according to the invention from several modules. A particularly preferred embodiment, for example, is composed of camera fastening modules, which are connected by means of intermediate members of different types and, where appropriate, additional T-pieces, with which, starting from an annular main frame, further half-annular or otherwise shaped modular segments with further camera fastenings or other fastenings can be attached. It is especially helpful in practice if these modules can be assembled without tools, in particular by plugging together. If the camera fastenings are also provided for toolless camera fastening, for example by being constructed as bowl-shaped receptacles, inserted in the cameras and being fixed by friction fit, a fully usable system is obtained without any additional tools. Alternatively, the camera fastenings can also be guided such that they triaxially span a camera, which is fastened therein, for example by means of a flexible clamping lip.

A modular system also permits a simple manner for adjusting the size of the device according to the invention, both regarding the internal diameter of the frame and also the stereo base. If the former is to be enlarged independently of the latter, or vice versa, different fastening modules are used; if both can or are required to be enlarged/modified simultaneously, it is sufficient to insert new intermediate members. It is also possible, through various plug or latched positions, to realise variable sizes with only one single set of modules.

The camera-mounting apparatus according to the invention furthermore preferably comprises a position stabilization device in order not to transfer rotations, tilts and changes of direction of the carrier vehicle and the person wearing it to the cameras, and thereby to the shots, when filming during walking, driving or other movement. In addition, this serves to further improve stabilization against camera shake.

A particularly preferred position stabilization means is a passive single-joint gimbal comprising a ball which is low friction and freely rotatable about three axes in a cavity or socket, which has a slightly larger clear internal diameter comparable to the diameter of the ball. The ball can be encompassed by the cavity walls and thus secured against lifting or jumping out. Fixedly connected to the ball, there is a shank, which extends through a hole in the cavity/socket, which is dimensioned such that the ball with shank covers at least a sufficient range of rotation. The meaning of the term "sufficient" in this context depends on the particular application. If the camera holding apparatus according to the invention is to be carried, for example, beneath an aircraft, it should be possible to compensate the maximum expected angle of bank and pitch during the flight by means of the suspension, such that the camera-mounting apparatus is always kept largely level and parallel to the earth's surface. The shank is in turn connected via support arms or other connecting means to the frame of the camera-mounting apparatus. It serves the purpose of positioning the centre of gravity of the camera holding device below the ball joint, such that the position stabilization occurs passively by the fact that the freely rotatable joint ball keeps the shank constantly parallel to the force vector acting on the camera-mounting apparatus. This force vector is composed of a gravitational force component and a dynamic component due to the accelerations of the wearer. It is therefore clear that the latter must be kept as low as possible if, in the above-described manner, a good stabilization is desired with alignment parallel to the equipotential surfaces of the gravitational force in the described manner.

The above-described single-joint joint suspension provides stabilization about the bank and pitch axis. A high degree of stabilization around the vertical axis is provided in the ideal case of a ball that is mounted as free of friction as possible and which is also supported so as to be rotatable about the vertical axis relative to the socket, also due to the moment of inertia of the camera-mounting apparatus according to the invention. In addition, for example, the shank could contain a low-friction swivel joint. It is also conceivable to integrate a stepping motor or other precision-controllable electric motor in the shank, permitting active tracking or stabilization about the vertical axis.

Alternatively, for effective position stabilization even at higher accelerations of the carrier platform, the position stabilization means comprise two ball joints, which are connected by a shank. The upper joint in this case would compensate for the relative angle to the carrier platform, as described above. However, the second joint would be preferably positioned in the centre of gravity of the camera mount, so that the force vector transmitted via the connecting shank cannot exert a tilting moment on the camera-mounting apparatus.

If, in addition to the essentially passive position stabilization, a comprehensive active post-correction possibility is desired, active drive elements for rotating the ball about all three axes can also be provided in the cavity or socket. For example, it is possible to provide electric motors with small wheels acting on the ball. Preferably three electric motors, that is to say one for each axis, could be integrated into the cavity.

The embodiment described so far only provides camera fastenings below the ball joint, so that it is very difficult to image the full sphere because, except when a camera-mounting apparatus is used that is much larger than the carrier vehicle, the latter is always in the field of view. To avoid this, the invention proposes, in a particularly preferred development of the camera-mounting apparatus according to the invention with position stabilization means in the form of a ball joint, to apply, in addition to the first, downwardly facing shank, further shanks. At least one further shank is to be provided, which is preferably fastened on the ball diametrically opposite the first shank, and, like the first, projecting radially outwards. At that end of this shank that faces away from the ball, in a similar manner to the first shank, it would be expedient to provide another frame with support arms holding camera fastenings.

This embodiment according to the invention thus preferably consists of two parts or, if the same number of identical cameras are used, of two halves, a first, which is disposed below the ball joint and which covers the lower half-space, and a second, arranged above the ball joint, which covers upper half-space. So that the centre of mass of the camera-mounting apparatus according to the invention as a whole still lies below the ball joint, which is important for passive gravity stabilization, the lower shank can be longer than the upper, or the lower part is heavier than the upper, or a combination of the two. In the preferred embodiment, in which the upper and lower part are similar, that is to say are substantially mutually mirror-symmetrical to one another, and in particular have the same number of cameras, it is also possible to increase the weight of the lower half by means of additional weights. This also makes it possible to use the same length of shanks, that is to say to choose the upper and lower halves actually geometrically mirror symmetrical. This has the result that, despite the same orientation of the cameras of both halves, the pivot point of the spherical image coincides with the physical fulcrum of the position stabilization device. This is preferred because, due to the highest possible symmetry in the arrangement and orientation of the cameras, first the assembly of the partial images into a spherical stereoscopic overall image becomes computationally much simpler and, consequently, even despite the residual movements still occurring, can be corrected with less computational effort.

Further preferred is an embodiment of the frame of the camera-mounting apparatus according to the invention in which this has a star-shaped structure at least in parts. Therein, from a central hub, supporting arms proceed radially outward, in order to save material, and, at the outer ends of these support arms, camera fastenings are attached individually, in pairs or else subdivided into larger groups. The camera fastenings would herein only be supported by the support arm holding them and would not be connected to the fastenings of other support arms. This offers the advantage that, in this way, a star shaped camera-mounting apparatus according to the invention, if it is to be composed of modules, can manage with fewer connections and can therefore be assembled significantly faster. A module would preferably consist of a support arm with a pair of camera fastenings attached thereon.

If this embodiment is to be combined with the above-described position-stabilizing means the, for example, upper and/or lower part, in each case covering at least one half-space part, can be designed in the star-shaped manner described above.

A further preferred embodiment provides positioning the cameras of the stereo pairs as far as possible directly side-by-side in order to achieve the most compact and space-saving arrangement. In a particularly preferred embodiment, two such side-by-side stereo pairs are assembled back-to-back, thus forming a module of four mounts in a plane, wherein the pairs of cameras look in opposite directions. If two such modules, with viewing directions twisted by 90 degrees, are mounted one on the other, a compact, approximately cube-shaped camera-mounting apparatus is obtained, which with cameras that in each case having an aperture angle of more than 90 degrees, can cover the full circle. To allow joining or stitching of individual images via software, some overlap of the field of view is necessary, which is why the camera aperture angle must be actually greater than 90 degrees, preferably 110 degrees or more.

In addition to compactness, the advantage of the above-described cube-shaped arrangement is as small a dead zone or dead angle as possible, that is to say the range not covered by any camera as well as the range not covered by any pair of cameras is minimal and, at a given distance, larger continuous ranges that are covered by two camera pairs occur, which facilitates the joining of the images. Thus, the presented cube-shaped mounting apparatus according to the invention is particularly suitable for stereoscopic panoramic images with many objects relatively near to the viewer.

To be able to complete the full circle into the sphere, individual or pairs of camera fastenings, disposed side by side, may be provided at the top or bottom of the cube-shaped camera-mounting apparatus according to the invention. Furthermore, it is useful to provide attachment means for attachment to a support means or suspension, for example in the form of holding webs. As location, it is recommended that the outsides of the camera fastenings be used, since the fastening means here lie in the dead zone of the entirety of the cameras.

Further features, characteristics and advantages are explained in greater detail below with reference to the drawings of preferred embodiments of the camera-mounting apparatus according to the invention. This serves only for illustration only and is in no way intended to limit the present invention.

BRIEF DESCRIPTION OF THE DRAWINGS

A brief description of the figures follows, wherein:

FIG. 1 shows a perspective view of a preferred embodiment of the camera-mounting apparatus 1 according to the invention together with a head-mounted carrying device. Starting from an equilateral hexagon with one pair of cameras per side, the frame 2 here forms an approximately equilateral dodecagon with a side length of about 7 cm. The device consists of three different types of modules, all of which are made of a rigid plastic by the 3D printing process, six camera fastening modules 10, with the outline of an obtuse isosceles triangle, with the largest angle being 120 degrees, the two short sides 11 being formed by the rear side 12 of the two camera fastenings 13, which are designed as hollow cuboid shells, with inserted cameras 4. At each end of the camera fastening module 10, slits or grooves 14 are introduced, into which the tongues 21 of approximately 7 cm-long, 2.5-3-cm-high intermediate members 20 are inserted. The tongues 21, with the rest of the intermediate member 20, enclose an angle of 150 degrees, as a result of which, out of a total of six fastening modules 10 and intermediate members 10, an (approximately) equilateral dodecagon is constructed. A particular embodiment of the intermediate members 20', seen in FIG. 1 at the end face, comprises a web 22, which leads obliquely upwards and serves to establish the connection with other fastening or damping means, in this case, a head-mounted carrying device 40. The cross-section of each individual module is optimised, with minimum use of materials, to achieve a large static and dynamic torsional and bending stiffness. This is necessary to keep deformations caused by vibrations, and the resulting shifts of camera positions with respect to each other, as small as possible. A high stiffness further causes a displacement of the mechanical natural oscillation frequency to higher values, thus reducing the oscillation amplitude. The high rigidity has been achieved here by incorporating reinforcing ribs into segments that are as far as possible designed as hollow bodies. This advantageously takes advantage of the shaping possibilities and freedom provided by 3D printing.

FIG. 2 shows the camera-mounting apparatus 1 of FIG. 1 in a perspective view from directly above. The dodecagonal shape of the frame 2 and the mounting of the modules via mutually inserted tongues 21 and grooves 14. A special intermediate member 20' attached at one end side has an upwardly extending web 22 to which, in this example, a head-mounted carrying device 40 consisting of an end plate and head, temple and cheek straps, with a chin pad.

It is also conceivable to use more than one special intermediate member to achieve a reduced susceptibility to vibration. For example, a three-axis vibration damping can be realized in a simple manner by means of connectors offset by 120 degrees, which are connected by means of mechanical or hydraulic dampers, with a support or carrying device.

Figure 1:
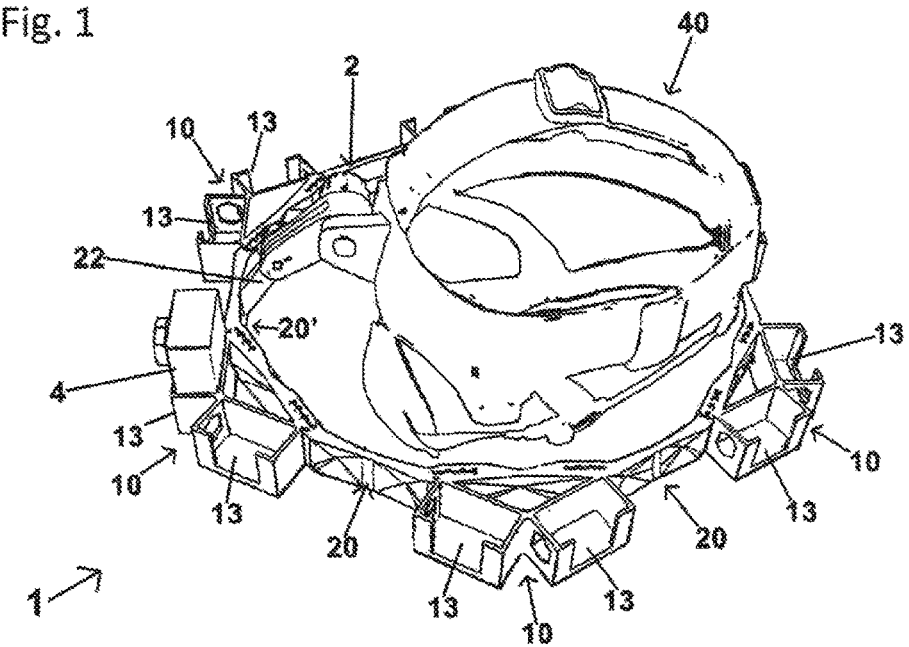
FIG. 1 shows a top perspective view of a preferred embodiment of the camera holding apparatus according to the invention.
Figure 2:
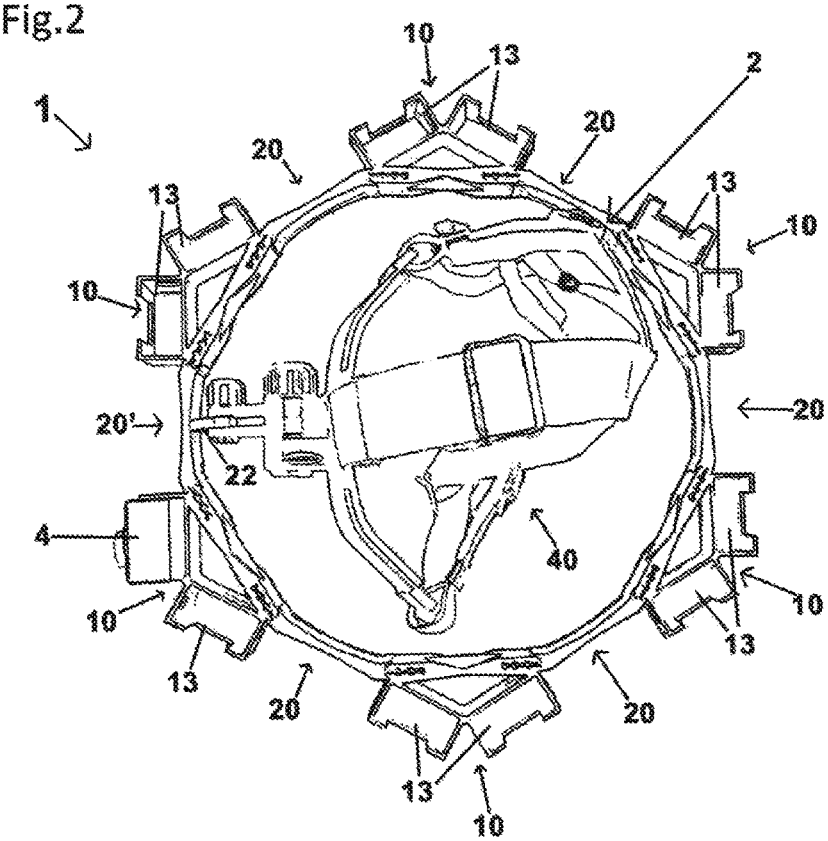
FIG. 2 shows a perspective top view of the camera holding apparatus of FIG. 1.
Figure 3:
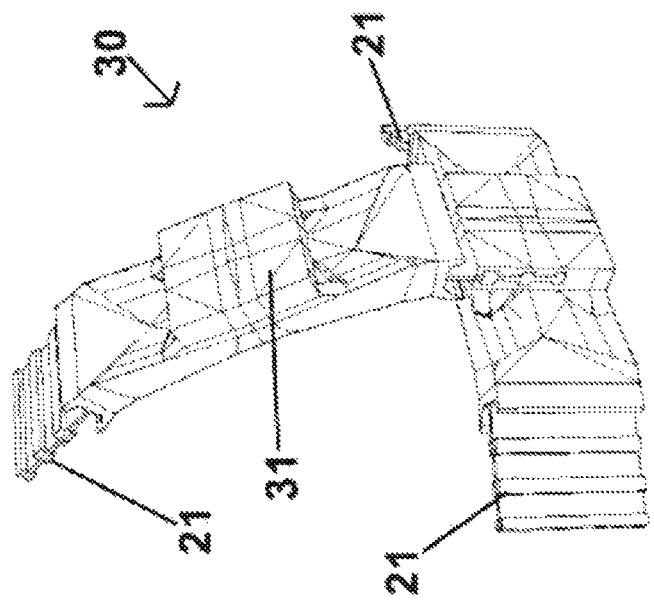
FIG. 3 shows a top perspective view of three types of modules of which the camera-mounting apparatus according to the invention from FIG. 1 is assembled.
Figure 3:
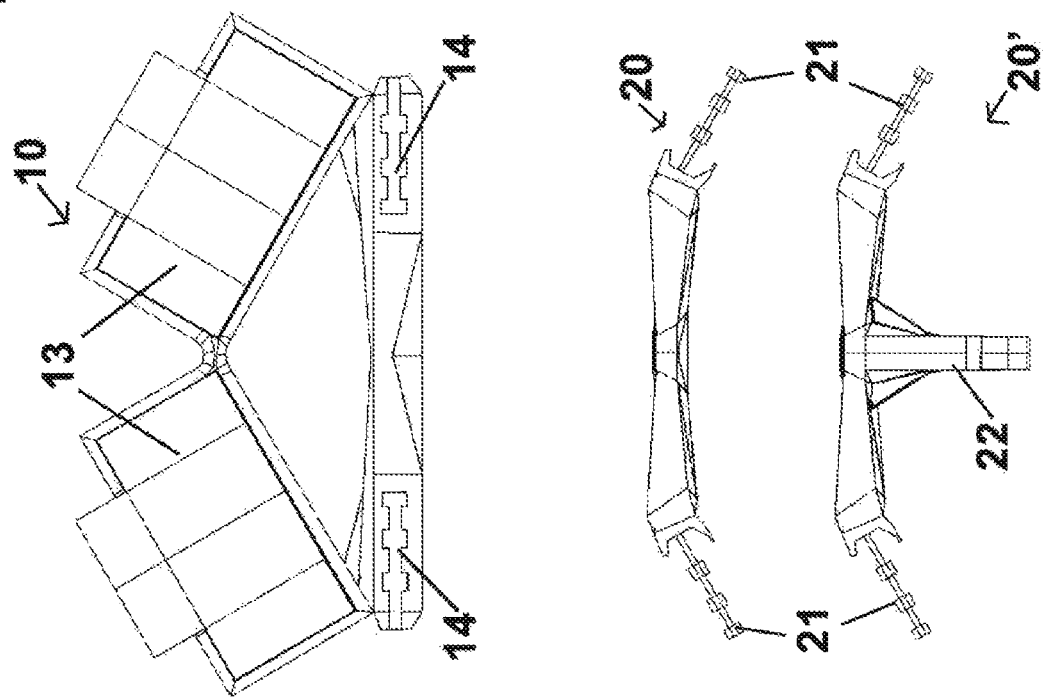

FIG. 3 shows four different modules used in the modular camera-mounting apparatus 1 according to the invention in a top perspective view. These are, first, the camera fastening members 10 and intermediate members 20 already described above, the latter in a design with and without angled web 22, as well as a T-piece 30, with which additional branches, in the form of bows assembled from the same modules, can be attached on the central frame ring 2. To achieve this, the T-piece 30, as compared to an intermediate member 20, comprises a connection segment 31, which is integrated in the centre on one end face 32 and forms an angle of approximately 30 degrees with the plane of the T-piece. This connecting segment 31 terminates in a tongue 22, with which other modules, provided with grooves, can be plugged, such as camera fastening modules 10.

Figure 4:
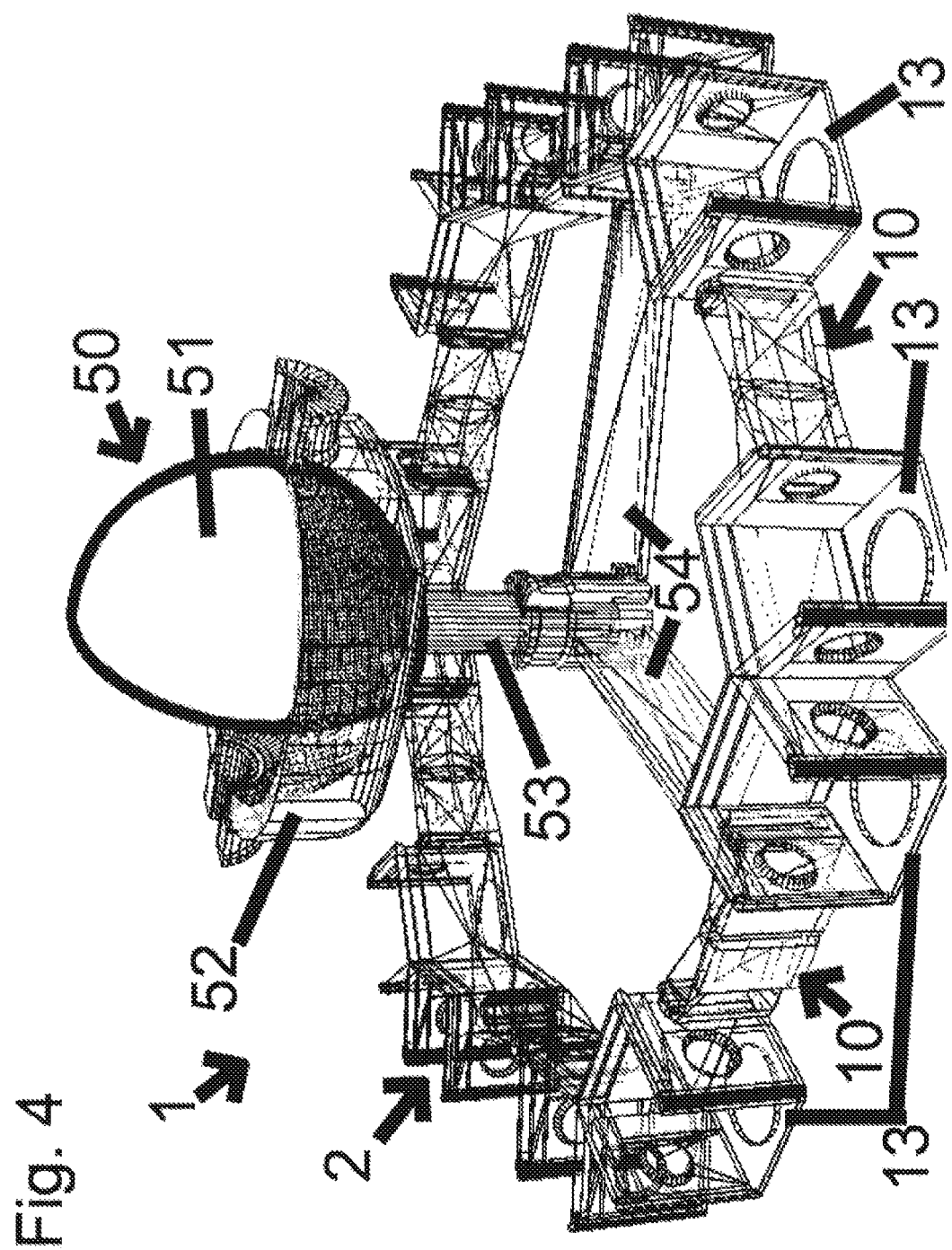
FIG. 4 shows a perspective view of a camera-mounting apparatus according to the invention with position stabilization device.

FIG. 4 shows in a perspective view, a camera-mounting apparatus according to the invention 1 with position stabilization device 50 in the form of a ball joint. This is attached inside the camera-mounting apparatus 1 and connected by means of three support arms 54 to the frame 2. Position stabilization means 50 consists of a ball 51, which is mounted in a cavity or socket 52 of round cross-section, with low friction, around all three axes (yaw, pitch and bank axis). The socket 52 has a concentric hole by means of which a connected, radially and downwardly oriented shank 53 engages, at its upper end, with the ball 51. The support arms 54 are detachably or non-detachably fixed at the lower end of the shank 53. The hole is adequately dimensioned to compensate for an expected pitch and banking angle.

Figure 5:
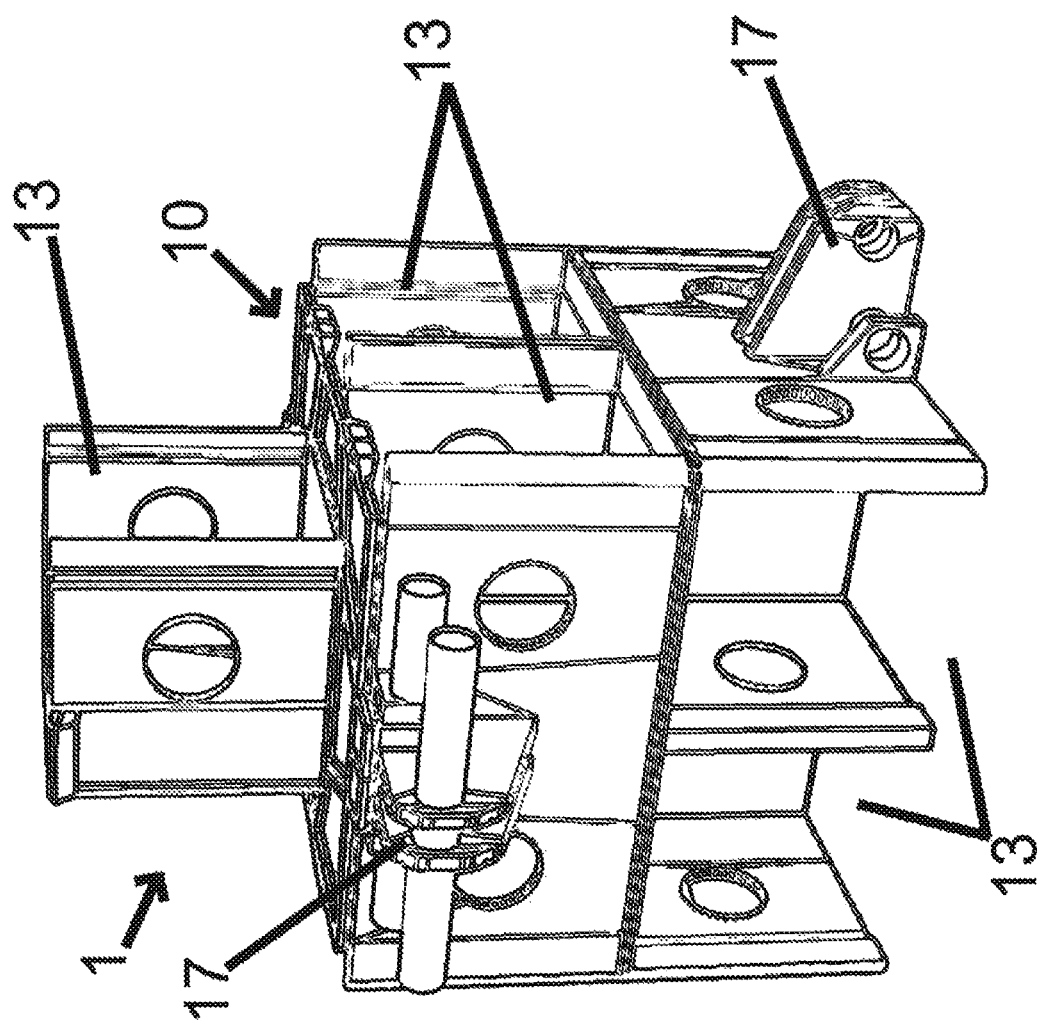
FIG. 5 shows a perspective view of a cube-shaped embodiment of the camera-mounting apparatus according to the invention.

FIG. 5 shows a perspective view of a preferred compact and approximately cuboidal camera-mounting apparatus 1. It consists of two planes superimposed one on the other, of which each consists of two pairs of camera fastenings 13 laid back to back. The direction of view of the upper plane is offset through 90 degrees relative to the lower plane, as a result of which, in conjunction with cameras that have an aperture angle of 90 degrees or more, the total full circle is covered with a dead angle that is minimised as a result of the compact arrangement. On the top side, a further camera fastening 13 with upward angle of view is attached to extend the full circle into a hemisphere. If a completely stereoscopic photograph of the hemisphere is desired, a further camera fastening 13 can be added on the top side. For each plane, fastening means 17 in the form of retaining webs are furthermore attached on the outer sides of the camera fastening in order to fasten the cube-shaped camera-mounting apparatus according to the invention on a carrying means or on a suspension.

Figure 6:
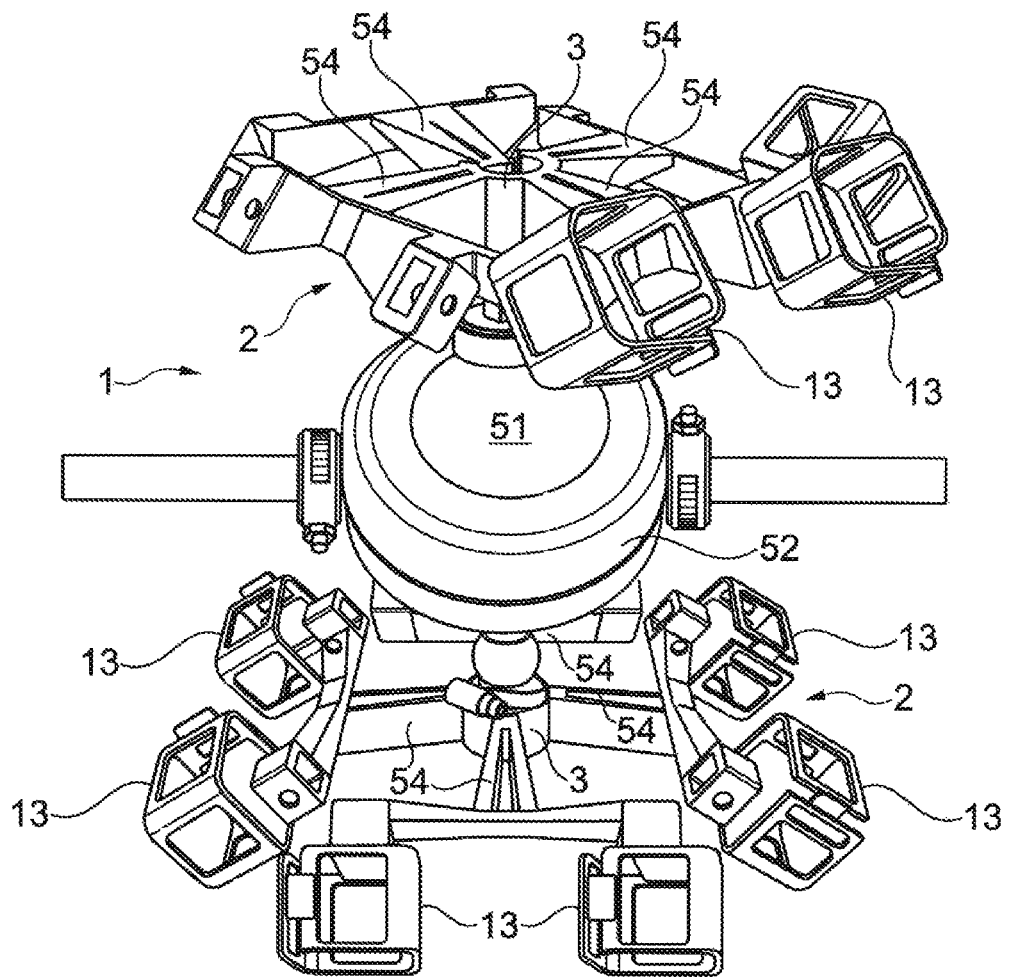
FIG. 6 shows a perspective view of a two-part position-stabilised camera-mounting apparatus for covering the full sphere.

FIG. 6 shows a perspective view of an embodiment of a camera-mounting apparatus according to the invention, which is position-stabilised by means of a ball joint, similar to that shown in FIG. 4. In addition to a radially downwardly facing shank 53, however, another upwardly radially facing shank 53', which is mounted diametrically opposite the ball 51, is provided. Further, the frame 2 is constructed not from annular support arms 54 but from support arms 54 emanating in a star-shape from a hub 3, at the outer ends of which camera fastenings 13 are held in pairs, such that the angles of view of the cameras inserted therein coincide with the pole direction of the covered half-space, which here coincides with the axis of the shank 53, forming an angle of less than about 45-50 degrees, which corresponds to half the aperture angle of the cameras conventionally used. This is achieved in that the pole direction lies in the field of view of all the cameras and thus an additional upward-facing camera or pair of cameras is not needed. On the upward-facing shank 53', a similar star-shaped holding device with frame 2, four support arms 54 and a hub 3 are mounted, which, however is mirrored relative to the lower hub and turned through 45 degrees.

Although the present invention has been described with reference to preferred embodiments, workers skilled in the art will recognize that changes may be made in form and detail without departing from the spirit and scope of the invention.

LIST OF REFERENCE CHARACTERS 11 camera-mounting apparatus
2 Frame
3 Hub
4 Camera
10 Camera fastening module
13 Camera fastening
14 Groove
17 Holding web
20 Intermediate member
20. Intermediate member with web
21 Tongue
22 Angled web
30 Tee-piece
31 Segment
32 End-face T-piece
40 Head-mounted carrying device
50 Position stabilization device
51 Joint ball
52 Joint socket
53 Shank
54 Support arm

The invention claimed is:

1. A camera-mounting apparatus comprising:
a mechanically stabilizing frame; and
a plurality of camera fastenings, each of which is suitable for receiving and fixing a camera, the camera fastenings being attached to and distributed around the frame and oriented such that when a camera having a field of view is received by each of the camera fastenings, overall field of view of all of the cameras is larger than the field of view of an individual camera;
wherein:
each point of the overall field of view of all of the cameras lies within the field of view of at least two of the cameras;
the frame is approximately ring-shaped, toroidal or bowl-shaped, or has the form of a hollow polygon, a hollow equilateral polygon of a hollow polyhedron; and
an interior of the frame includes a cavity for receiving a head of a person wearing the device, or a small (approximately head-sized) vehicle or aircraft.

2. The camera-mounting apparatus according to claim 1, wherein the overall field of view of all of the cameras comprises a full circle or the entire sphere.

3. The camera-mounting apparatus according claim 1, wherein the camera fastenings are arranged in pairs and are oriented such that in each case two cameras always have substantially the same field of view.

4. The camera-mounting apparatus according to claim 3, wherein all pairs of camera fastenings are mounted equidistant from each other.

5. The camera-mounting apparatus according to claim 1, wherein the camera fastenings are located on corners of a polygon, an equilateral polygon, or a polyhedron.

6. The camera-mounting apparatus according to claim 1, wherein in the interior of the frame there are provided:
damping elements that are mechanically connected thereto; and
a head-mounted carrying device, which is connected thereto optionally via one or more damping elements.

7. The camera-mounting apparatus according to claim 1, wherein the camera-mounting apparatus is prepared for fastening on an unmanned small vehicle or aircraft and/or is assembled from modules that can be joined without tools or plugged together.

8. The camera-mounting apparatus according to claim 1, wherein the frame:
is optimized with reinforcing ribs for torsional and flexural stiffness; and/or
is adjustable in an inner diameter.

9. The camera-mounting apparatus according to claim 1, wherein the distances between the cameras are adjustable with respect to each other.

10. The camera-mounting apparatus according to claim 1, wherein the fastening of the cameras in the camera fastenings is carried out without tools, the cameras being held by friction and/or by being triaxially braced in the camera fastenings.

11. The camera-mounting apparatus according to claim 1, including holders for accessories selected from the group consisting of lights, microphones and motion sensors.

12. The camera-mounting apparatus according to claim 1, including a position-stabilization device.

13. The camera-mounting apparatus according to claim 12, wherein said position stabilization device includes a ball joint with a ball which is rotatably mounted with low friction in a perforated cavity, said ball being connected, via a first shank, which is guided through a hole of the cavity, and connected to the frame of the camera-mounting apparatus by support arms.

14. The camera-mounting apparatus according to Claim 13, wherein the position-stabilization device includes a second ball joint positioned in the centre of gravity of the camera holding apparatus, wherein the first shank connects the two ball joints, and the support arms engage the second ball joint.

15. The camera-mounting apparatus according to claim 13, wherein the position-stabilization device includes at least one second shank, which is preferably fastened on the ball, diametrically opposite to the first shank.

16. The camera-mounting apparatus according to claim 15, further comprising camera mounts that are connected to the at least one second shank via support arms at an end remote from the ball of the at least one second shank.

17. The camera-mounting apparatus according to claim 1, wherein the frame, at least partially, has a star-shaped structure in which the camera attachments are held singly, in pairs or in larger groups only by means of support arms emanating from a central hub.

18. The camera-mounting apparatus according to claim 1, wherein the total field of view of a part of the cameras comprises a hemisphere, wherein, for each camera of this part of the cameras, an angle between the polar axis of the hemisphere and the direction of view of the camera is less than half an aperture angle of the camera.

19. The camera-mounting apparatus according to claim 18, further comprising:
on outer sides of the camera fastenings, connecting webs; and/or further camera fastenings on an upper and/or a lower side.

20. The camera-mounting apparatus according to claim 1, wherein the camera fastenings are arranged directly next to one another.

21. The camera-mounting apparatus according to claim 1, wherein the plurality of camera fastenings comprise a cube-shaped arrangement comprising eight camera fastenings, wherein the camera fastenings are arranged in pairs next to each other and two of the pairs, when laid back-to-back, form a plane of the cube-shaped arrangement, comprising a total of two planes, the viewing directions of the cameras of the two planes being offset by 90 degrees.

* * * * *